United States Patent [19]

Aoyama et al.

[11] Patent Number: 4,876,049
[45] Date of Patent: Oct. 24, 1989

[54] METHOD FOR PREPARING MOLDED ARTICLES OF ULTRA-HIGH MOLECULAR WEIGHT POLYETHYLENE

[75] Inventors: Takeo Aoyama, Yokohama; Teruo Imai, Kawasaki; Junichi Hattori, Yokohama; Mikio Uehara, Tokyo, all of Japan

[73] Assignee: Nippon Petrochemicals Co., Ltd., Japan

[21] Appl. No.: 932,918

[22] Filed: Nov. 19, 1986

[30] Foreign Application Priority Data

Nov. 21, 1985 [JP] Japan .................. 60-261874
Dec. 12, 1985 [JP] Japan .................. 60-280084
Dec. 12, 1985 [JP] Japan .................. 60-280085

[51] Int. Cl.[4] .................. C08J 9/26; B29C 67/14; B29C 51/28
[52] U.S. Cl. .................. 264/49; 156/245; 156/309.6; 264/112; 264/125; 264/259; 264/314; 264/321; 264/322; 264/325; 425/389; 425/DIG. 112; 428/245; 428/256; 428/461; 428/513
[58] Field of Search .................. 264/49, 321, 314, 112, 264/125, 259, 322, 325; 156/245, 309.6; 425/389, DIG. 112

[56] References Cited

U.S. PATENT DOCUMENTS

| | | | |
|---|---|---|---|
| 3,566,449 | 3/1971 | Goins et al. | 264/DIG. 83 |
| 3,891,736 | 6/1975 | Voaden | 264/314 X |
| 4,187,621 | 2/1980 | Cohen | 264/321 X |
| 4,265,851 | 5/1981 | Roth | 264/321 |
| 4,336,221 | 6/1982 | Garabedian | 264/314 X |
| 4,350,485 | 9/1982 | Larribe | 425/389 |
| 4,353,855 | 10/1982 | Garabedian | 264/314 X |
| 4,443,401 | 4/1984 | Turner | 264/314 X |
| 4,535,100 | 8/1985 | Krutchen et al. | 264/321 X |
| 4,538,787 | 9/1985 | Fox et al. | 264/321 x |
| 4,639,343 | 1/1987 | Long et al. | 264/321 X |
| 4,793,882 | 12/1988 | Brehmer et al. | 264/112 X |

FOREIGN PATENT DOCUMENTS

| | | | |
|---|---|---|---|
| 60-46215 | 3/1985 | Japan . | |
| 1044502 | 10/1966 | United Kingdom | 264/49 |
| 1044503 | 10/1966 | United Kingdom | 264/49 |

Primary Examiner—Philip Anderson
Attorney, Agent, or Firm—Ostrolenk, Faber, Gerb & Soffen

[57] ABSTRACT

The present invention provides a method for preparing a molded article of an ultra-high molecular weight polyethylene which is characterized by compression-molding, or heating and pressurizing a porous sheet of said ultra-high molecular weight polyethylene. The porous sheet may be superposed with a substrate, and may be wrapped around a deformable member of a mold and densified by deformation of said member.

15 Claims, 9 Drawing Sheets

METHOD FOR PREPARING MOLDED ARTICLES OF ULTRA-HIGH MOLECULAR WEIGHT POLYETHYLENE

BACKGROUND OF THE INVENTION (i) Field of the Invention

The present invention relates to a method for preparing molded articles of an ultra-high molecular weight polyethylene which has a high melt viscosity, an excellent wear resistance and impact resistance, and a small friction coefficient.

(ii) Description of the Prior Art

Since an ultra-high molecular weight polyethylene (hereinafter referred to as UHMWPE) is excellent in wear resistance and has a small friction coefficient to a variety of materials, its application to sliding parts is now desired. For example, when an artificial joint is made from a metal or a ceramic, it cannot be used without additional treatment because of its great friction coefficient between sliding surfaces. Therefore, it is necessary that a lubricating material be interposed between the sliding surfaces.

Some properties which the lubricating material must possess are (1) to be nontoxic and odorless, (2) to provide a sufficient lubricating function over a long period of time, (3) to render the surfaces of parts smooth and to permit smooth movement, and (4) to bring about no chemical reaction. Taking into account these conditions, it will be easily understood that an ultra-high molecular weight polyethylene, UHMWPE, is suitable for lubrication.

The above mentioned lubricating material may be used in the form of plane parts on occasion, but it may usually be taken in hemispherical and more intricate forms.

Further, the UHMWPE material is eligible for use in a transfer pipe for a slurry and a powder which cause severe abrasion on metallic materials, an elbow in which the flow direction of a fluid to be transferred therethrough changes, an agitated vessel, a sliding part and the like. In addition, since the UHMWPE is excellent in impact resistance, particularly the resistance to repeated impact, it is strongly desired that the UHMWPE material be utilized as an impact-absorbing stopper, or a hollow molded article such as a bellows-shaped article or the like in various industrial machines.

Articles, sheets and plates of the UHMWPE are formed by various methods, for example, sintering, ram extrusion using a plunger pump, forging and compression molding. However, it is very difficult to directly produce thin sheets or films (hereinafter referred to simply as "sheets") of less than 3 mm in thickness from the crude powder of UHMWPE. According to present industrial practice, thin sheets of this kind are produced by applying a postforming such as skiving to a cylinder obtained by one of the above-mentioned methods. With this method, however, the processing cost is high and continuous production of thin sheets on a large scale is quite difficult.

The difficulty in processing the UHMWPE arises from the fact that it has quite a high melt viscosity and does not have good melt flow properties, and therefore, the conventionally employed blown-film extrusion method and T-die method in which the pressure drop is large are not suitable.

In consequence, it is strongly desired on an industrial scale to manufacture the lubricating parts directly from the crude powder of the UHMWPE, if possible.

In general, if an attempt is made to thermally mold the lubricating parts from UHMWPE crude powder, the latter will be concentrated on the bottom of a mold, and if compression molding is carried out in the state of such an inclined distribution, the resulting article will have a bottom portion locally thickened.

In particular, it is very difficult or actually impossible that a thin-wall article having a non-planar form such as cylindrical, hemispherical, spherical or corrugate shape is molded with a high thickness accuracy by the compression molding. The reason is as follows: In order to mold the article having an accurate thickness, it is necessary that the UHMWPE crude powder be distributed in a predetermined thickness in the mold, but the UHMWPE crude powder which freely flows at room temperature cannot be set, against the gravity, in predetermined thickness in the mold.

Moreover, the molded article having an arbitrary hollow shape such as a pipe, an elbow, a tee, a vessel, or a profile cannot be easily manufactured from the crude UHMWPE powder.

It is also difficult to manufacture composite molded articles from the UHMWPE material.

For example, for the purpose of giving slipping properties and wear resistance to the surface of a rubber, while rebound or non-rebound properties of the rubber are maintained, it is desirable to superpose a thin UHMWPE layer having a thickness of about 0.5 mm on the rubber. However, when the usual compression molding method is employed, the UHMWPE crude powder cannot be set uniformly and thinly on the surface of the rubber. Thus, the UHMWPE layer is first molded and then skived to prepare a desired thin sheet. Afterward, the thus prepared thin sheet is superposed on the rubber. It is natural, therefore, that the article manufactured in this way is expensive.

For improvement of poor stiffness of the UHMWPE layer, it is desirable to superpose the said layer on a metallic plate, a thermosetting resin, a thermoplastic resin, a cloth or the like having a less elongation. However, a composite sheet having the thin UHMWPE layer cannot be made from the UHMWPE crude powder by the compression molding method because the UHMWPE crude powder cannot be set in the mold with an accurate thickness. The UHMWPE cannot be, therefore, applied to a fender or a door panel for an automobile for which thinness, high stiffness and high impact resistance are necessary.

OBJECTS OF THE INVENTION

In view of the above described state of the prior art, the inventors of the present application have carried out extensive studies in order to solve these problems, and as a result, the present invention has been accomplished.

A first object of the present invention is to provide a method for molding, with good thickness accuracy, a thin-wall UHMWPE porous sheet into a thin-wall molded article having a special shape such as cylindrical, hemispherical, spherical or corrugate shape into which it is very difficult or impossible to mold a UHMWPE crude powder conventionally.

A second object of the present invention is to provide a method for easily preparing an arbitrary hollow molded article such as a pipe, a corrugate pipe, an elbow, a tee, a bellows or a vessel, or a profile article from the aforesaid UHMWPE porous sheet.

A third object of the present invention is to provide a method for easily preparing a composite UHMWPE article by superposing a UHMWPE porous sheet on at least one substrate selected from the group consisting of a thermoplastic resin, a thermosetting resin, a metallic sheet, a metallic foil, a rubber, a cloth, a paper and a ceramic.

SUMMARY OF THE INVENTION

The present invention is directed to a method for preparing a molded article of the UHMWPE which is characterized by compression-molding, or by heating and pressurizing a UHMWPE porous sheet or a UHMWPE porous sheet superposed with a substrate by the use of a mold, to densify said sheet.

DETAILED DESCRIPTION OF THE INVENTION

Figure 1:
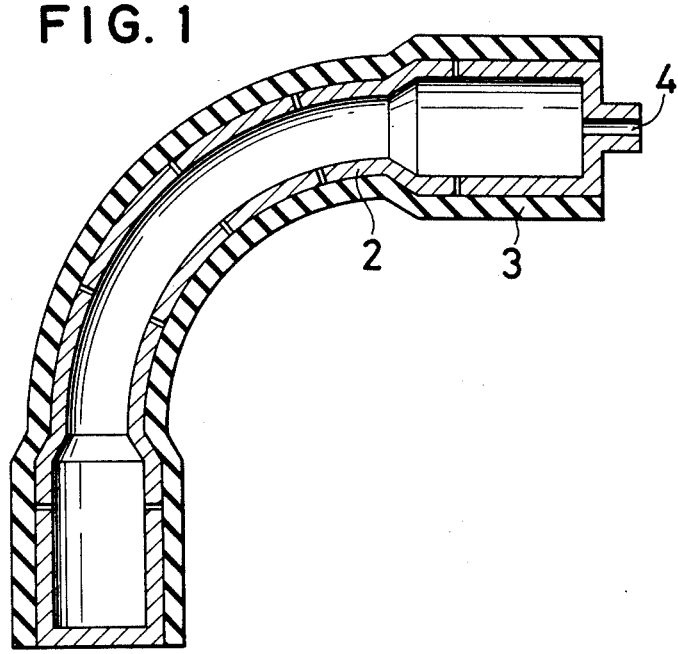
FIG. 1 is a schematic section of a deformable member in which an elbow-like steel pipe having through holes is coated with a silicone tube.

The UHMWPE referred to in the present invention means the polyethylene resins having a very high molecular weight as represented by an intrinsic viscosity of 8 dl/g or higher in a decalin solution at 135° C.

A porous sheet used in the present invention means a porous sheet prepared by compounding extractable material with the UHMWPE, molding and removing solvent-soluble components by extraction therefrom, or alternatively by feeding the UHMWPE powder to between at least two heated rolls rotating in mutually reverse directions, and melting the powder into a sheet at a molding temperature more than 140° C.

In the latter type of the porous sheet, the UHMWPE particles are loosely bound, and this sheet has greater thickness accuracy and processability and can be manufactured continuously and inexpensively, though being poorer in tensile strength, elongation at break and the like, as compared with the completely densified sheet. Therefore, the aforesaid porous sheet can be preferably utilized a for fabrication and will be referred to as preformed sheet.

The thermoplastic resins that are used as the substrates are exemplified by polyolefin resins including homopolymers such as high density or low density polyethylene, polypropylene, polybutene-1 and poly-4-methylpentene-1; copolymers of one of α-olefins such as ethylene or propylene as major components with other polar or nonpolar monomers, e.g., copolymers of ethylene or propylene with other α-olefins, ethylene-vinyl acetate copolymer or its saponification product, and copolymers of ethylene with unsaturated carboxylic acids or their derivatives; polystyrene resin; polyacrylic resins; polyvinyl chloride resin; polyvinylidene chloride resin; polyamide resins such as nylon-6 (trademark of E.I. du Pont), nylon-6,6, nylon-11, nylon-12 and aromatic polyamides; polycarbonate resin; cellulose resins; polyester resins such as polyethylene terephthalate and polybutylene terephthalate; fluorocarbon resins such as polytetrafluoroethylene; polyimide resins; polyamide imide resins; polyether-ether ketone resins; polyether sulfone resins; polysulfone resins; polyphenylene oxide resins; polyphenylene sulfide resins; and polyacetal resins.

The thermosetting resins that are used as the substrates are exemplified by epoxy resins, phenol resins, urethane resins, urea resins, melamine resins, diallyl phthalate resins, and unsaturated polyester resins.

The rubbers as the substrates are exemplified by synthetic rubbers such as polybutadiene, polyisoprene, neoprene rubber, ethylene-propylene copolymer, ethylene-propylene-diene copolymer, styrene-butadiene copolymer, styrene-acrylonitrile copolymer, styrene-acrylonitrilebutadiene copolymer, butyl rubber, polyurethane rubber, chlorosulfonated polyethylene, chlorinated polyethylene, fluororubber, and Thiokol (trademark of Thiokol Chemical Corp.); and natural rubber.

The metals as the substrates are exemplified by metal foils, metal sheets, wire nets, and punched plates of metals such as iron, aluminum, copper, zinc, brass, and nickel.

The cloths as the substrates are exemplified by woven or non-woven fabrics and nets of fibrous materials such as tape yarns or monofilaments of the foregoing thermoplastic resins; thinly and finely divided or fibrillated polymeric film; woven fabrics of synthetic resin fibers such as polyvinyl alcohol fibers and polyethylene terephthalate fibers, and natural fibers such as cotton, silk and linen; and woven fabrics, mats and felts of inorganic fibers, e.g., glass fibers, carbon fibers and metal fibers.

The papers as the substrates are not limited to any particular kinds, but are exemplified by packaging papers such as kraft paper and machine glazed paper; thin paper such as glassine paper; boards and other machine-made paper; Japanese paper such as sliding door paper (shoji paper); any synthetic papers such as styrene paper and polyvinyl alcohol paper.

Furthermore, it is to be noted that the foregoing thermoplastic resin sheets containing fillers can also be used in the method of the present invention.

The above fillers are exemplified by calcium carbonate, magnesium carbonate calcium sulfate, calcium sulfite, calcium silicate, clay, diatomaceous earth, talc, alumina, siliceous sand, glass powder, iron oxide, metal powders, antimony trioxide, silicon carbide, silicon nitride, silica, boron nitride, aluminum nitride, wood flour, carbon black, mica, glass flakes, sericite, pyrophyllite, aluminum flakes, graphite, Shirasu balloons (made in Japan), metal balloons, glass balloons, pumice powder, glass fiber, carbon fiber, graphite fiber, whisker, metal fiber, asbestos, and organic fibers.

The compounding ratio of the above exemplified fillers varies according to the purposes and uses of the laminated sheets; however, the amount is preferably in the range of 5 to 1000 parts by weight of a filler to 100 parts by weight of a thermoplastic resin. Moreover, foamed materials and cross-linked substances derived from the foregoing thermoplastic resins can also be employed as the substrates in the method of the invention.

A first invention of the present application is directed to a method for preparing a molded article of the UHMWPE porous sheet or a laminate of the UHMWPE porous sheet and a substrate by compression-molding, or heating and pressurizing the UHMWPE porous sheet or the said porous sheet superposed with the substrate, and melting the said sheet to densify it.

The very important matter in the present invention is that molding is carried out by the use of the preformed sheet of the UHMWPE.

The above mentioned compression molding may be carried out by setting, in a mold, the preformed UHMWPE sheet and the substrate which have been heated up to a level of room temperature to 300° C., preferably 130° to 250° C., applying a pressure of 0.1 kg/cm$^2$ or more, preferably 1 kg/cm$^2$ or more for a period of several seconds to several hours, cooling and taking out the resulting article from the mold, or alternatively, instead of heating the preformed sheet and the substrate, there may be employed a procedure of setting the preformed sheet and the substrate in the mold heated up to 140° to 300° C., applying pressure and cooling the resulting article. Further, both the mold and the preformed UHMWPE sheet may be heated.

In these manners, each of the preformed sheet and the substrate is not limited to only one, and the two or more preformed sheets and substrates may be used superposing them so as to give a necessary thickness to the finished articles. The higher the pressure to be applied is, the better, but as the pressure becomes higher, the strength of the mold to be used must be increased. Therefore, it is undesirable to increase the pressure too much, though not being limited particularly.

In the present invention, the laminate of the UHMWPE sheet and the substrate can be prepared without interposing any adhesive therebetween, but preferably an adhesive is used therebetween. In the case of using no adhesive, it is preferred that the preformed UHMWPE sheet and/or the substrate is subjected to a surface treatment such as a flame treatment, a corona discharge treatment or a plasma treatment.

The usable adhesives are not limited especially. Examples of the adhesives arbitrarily used in the present invention include usual epoxy series, polyurethane series, modified acrylic series, cyanoacrylate series, anaerobic adhesives, various hot melt series, various emulsion series, urea resin series, melamine series, phenol series and rubber series adhesives, as well as copolymers of ethylene and unsaturated carboxylic acids or their derivatives such as vinyl acetate, acrylic acid, methacrylic acid, maleic acid and maleic anhydride, copolymers of ethylene and with glycidyl derivatives, ionomers, and polyolefins graft-modified with the aforesaid unsaturated carboxylic acids.

In the present invention, the constitution consisting of the preformed UHMWPE sheet and the substrate is not restricted particularly, but if a high stiffness is required, it will be preferable that the substrate layer having a high stiffness is disposed at a position as near to the surface of the article as possible. If high stiffness, excellent wear resistance and low frictional properties are desired, it will be preferred that an additional UHMWPE sheet is further put on the substrate having the high stiffness.

A second invention of the present application is directed to a method for preparing a hollow article such as a hollow pipe, an elbow or a tee, or a profile of the UHMWPE which is characterized by coating a deformable member consisting of a cylindrical form, a profile or the like with the above mentioned porous sheet or the said porous sheet superposed with the substrate, setting the member in a deformable mold, heating the mold expanding or deforming the deformable member to thereby allow the sheet to adhere closely to the mold under pressure, and melting the sheet for its densification.

The deformable member used in the present invention is composed of a rubbery material, a plastic alloy, a shape memory alloy or the like, and when the UHMWPE porous sheet is wound around the deformable member, a non-adhesive material such as Teflon or silicone is preferably interposed between the sheet and the easy-deforming member.

The expansion of the deformable member is suitably carried out by applying an internal pressure to the interior of the deformable member with the aid of a gas or a liquid, and this internal pressure can be supplied by the utilization of the thermal expansion of the gas or the liquid through heating, or by means of a compressor.

In the case that the above mentioned deformable member is composed of the rubbery material, it is recommended to insert a pipe-like support having holes into the rubbery material, in winding the UHMWPE sheet around the deformable member, whereby the deformable member will not be prevented from being deformed during the winding operation and thus this operation will be easily carried out.

In the present invention, the deformable member wound with the UHMWPE sheet is then set in a predetermined mold, and the latter is heated up to a level of 140° to 300° C. so as to expand the easy-deforming member, so that the sheet is allowed to adhere closely to the mold under pressure and is melted for its densification. In this case, a means for heating the mold is not limited particularly, and electricity, a gas, an oil bath, steam or the like may be used as the heating means.

EXAMPLE 1

A UHMWPE powder was fed between two rolls rotating in mutually reverse directions under conditions that the clearance between two rolls was 0.2 mm and the molding temperature was 154° C., thereby preparing porous sheets each having a thickness of 0.35 mm.

These porous sheets were superposed to prepare laminates composed of 2 sheets (0.7 mm thick) and 4 sheets (1.4 mm thick), respectively, and each laminate was set in a hemisphere mold (draw ratio=0.2) consisting of a pair of upper and lower portions which had been heated up to 180° C., and molding was carried out by means of a hydraulic press in order to prepare molded articles of 0.5 mm and 1 mm thick.

With regard to the molded articles of 0.5 mm and 1 mm thick, mean deviations of thickness were as small as 0.05 mm and 0.06 mm, respectively, which fact indicated that these molded articles had a uniform thickness.

Each mean deviation just described was obtained by measuring the thickness at 6 points at an interval of 1 cm in a radial direction on a hemispherical molded article having a diameter of 10 cm and a depth of 2 cm.

COMPARATIVE EXAMPLE 1

The UHMWPE powder used in Example 1 was set in a mold, and heating was then carried out up to 180° C., followed by press molding in order to prepare molded articles of 0.5 mm and 1 mm thick, as in Example 1. For each molded article, a mean deviation of thickness was measured. In the case of this Comparative Example 1, the mean deviations of the molded products of 0.5 mm and 1 mm thick were as large as 0.16 mm and 0.25 mm, respectively, which fact indicated that the procedure of Comparative Example 1 could not provide any molded articles having a uniform thickness.

EXAMPLE 2

A UHMWPE powder (trade name Hizex Million 240 (S); Mitsui Petrochemical Industries, Ltd.) was fed between two rolls rotating in mutually reverse directions under conditions that the roll gap was 0.2 mm, the molding temperature was 154° C. and the roll peripheral speed was 2 m/min, thereby melting the powder and preparing preformed sheets each having a thickness of 0.34 mm and a void ratio of 11%.

Figure 2:
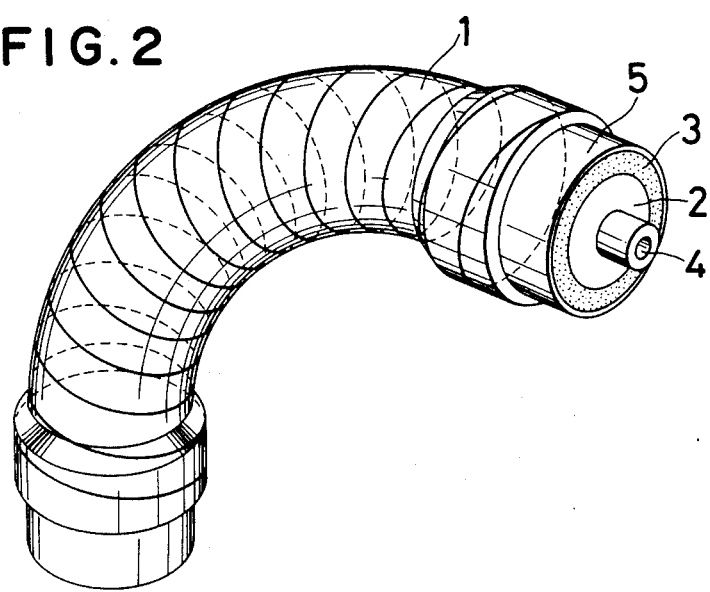
FIG. 2 is a side view of the deformable member around which a preformed UHMWPE sheet is wound.

Next, an elbow-like steel pipe 2 having a 1 mm diameter holes, as shown in FIG. 1, was covered with a silicone rubber tube 3 having a thickness of 3 mm, and the above preformed sheet 1 was then wound around the rubber tube 3 in a spiral state so as to overlap the edge portions of the sheet 1, as shown in FIG. 2.

Figure 3:
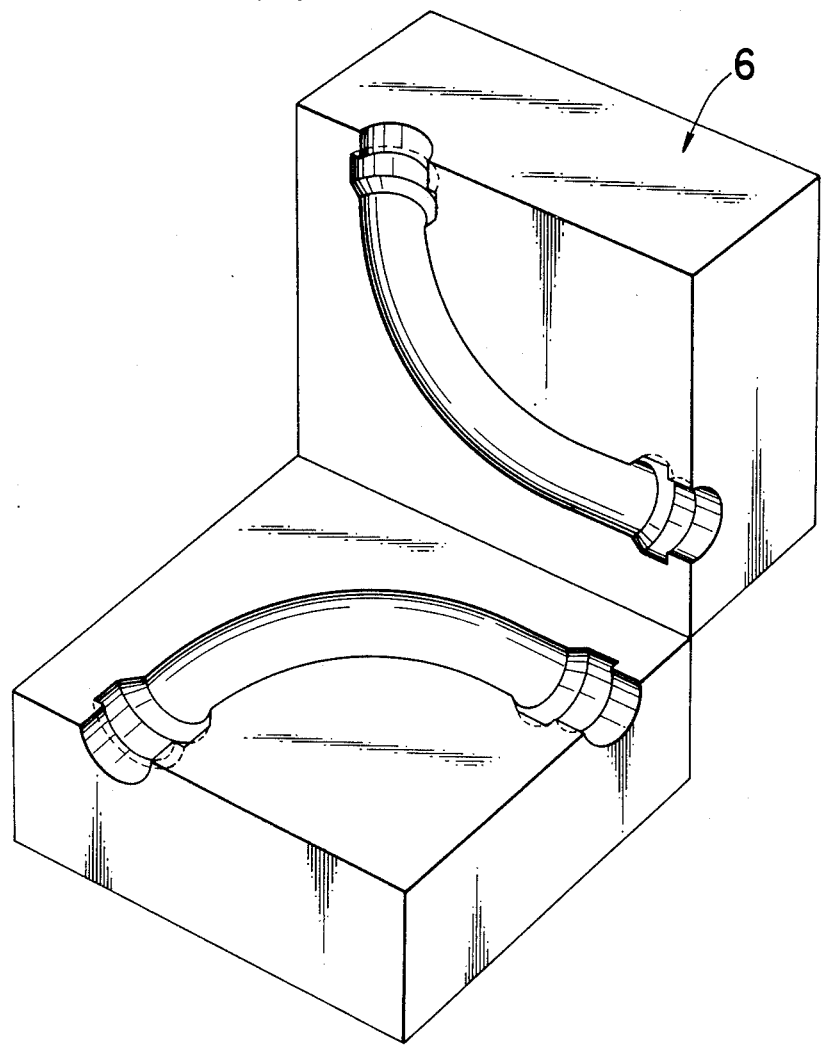
FIG. 3 is a perspective view of an elbow mold.

The resulting deformable member around which the preformed sheet had been wound was placed in an openable elbow mold 6 heated up to 180° C. which was a little larger than the deformable member, as shown in FIG. 3. Then, the mold was closed, and the silicone rubber tube 3 was fastened on the end portion thereof by a ring 5 (FIG. 4).

Figure 4:
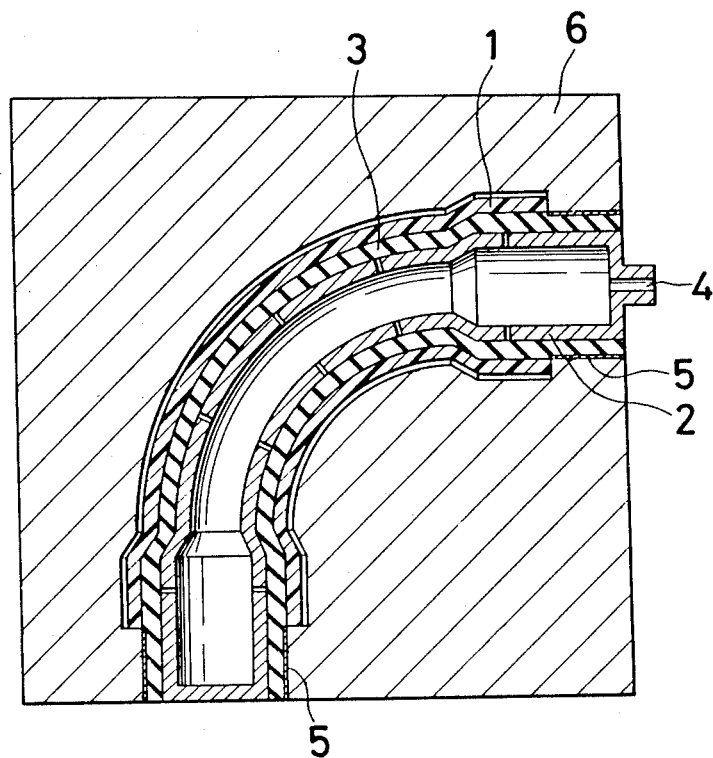
FIG. 4 is a schematic section of the elbow mold in which the deformable member wound with a preformed UHMWPE sheet is set.

FIG. 4 shows a section in which the formable member was set in the mold. An air pressure of 12 kg/cm$^2$ was applied through a pressurizing hole 4 to expand the silicone rubber tube 3 and to thereby press the preformed sheet 1 against the mold 6. The heating and pressurizing operation was carried out for 5 minutes in this way, whereby the sheet was melted and densified.

Next, the mold 6 was cooled to a level of room temperature, remaining pressurized, and the air was drawn off through the pressurizing hole 4. The mold was then opened, and at this time, the elbow of the UHMWPE which was completely densified could be obtained. With regard to the thus obtained elbow-like molded article, outer diameters at its both end portions was 55 mm, and an outer diameter at its intermediate portion was 50 mm. In its outer peripheral portion of the bend, radius was 100 mm and the wall thickness was 0.3 mm, and in its inner peripheral portion, the radius was 50 mm and the wall thickness was 0.6 mm.

Further, a test piece was prepared by cutting off a certain portion of the elbow-like molded article and was subjected to a physical properties measuring test. The results are set forth here.

Tensile strength at yield point . . . 200 kg/cm$^2$
Tensile strength at break . . . 395 kg/cm$^2$
Elongation at break . . . 400%
(Testing method: ASTM-D638)

EXAMPLE 3

A sheet preformed in the same manner as in Example 2 was applied onto a silicone rubber tube 3 as the deformable member with which ah elbow-like steel pipe 2 had been covered and an additional sheet was further wound in a spiral state over the former one in order to increase the wall thickness of its preformed sheet. Except or this step, the same procedure as in Example 2 was carried out to prepare an elbow, the outer and inner peripheral portions of the bend having a similar wall thickness of 0.6 mm.

EXAMPLE 4

Figure 5:
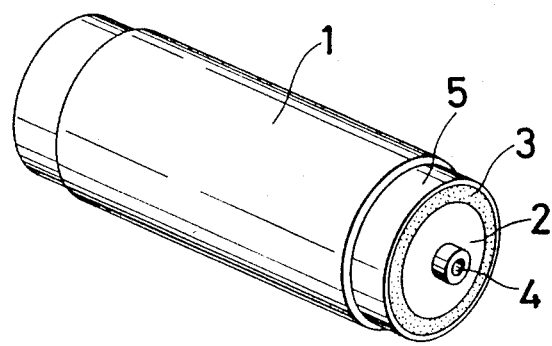
FIG. 5 is a perspective view of a cylindrical deformable member around which a preformed UHMEPE sheet is wound.
Figure 6:
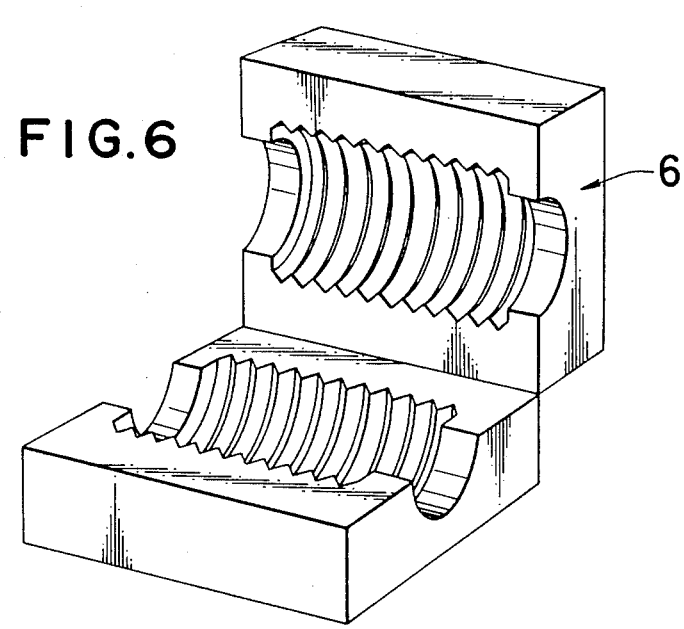
FIG. 6 is a perspective view of a bellows mold.
Figure 7:
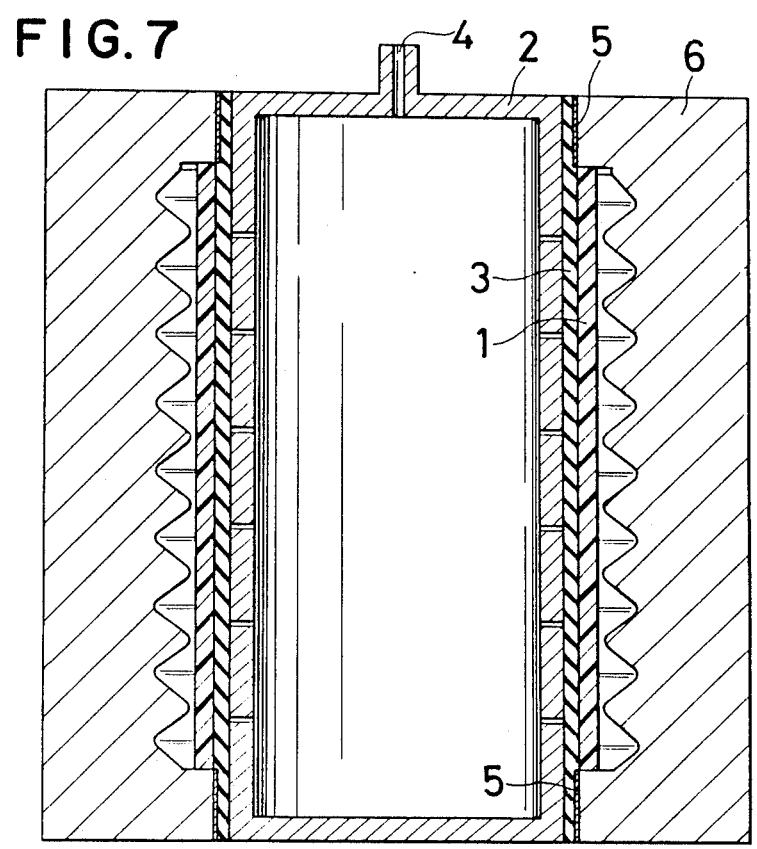
FIG. 7 is a schematic section of the bellows mold in which a deformable member wound with a preformed UHMWPE sheet is set.

A preformed sheet 1 having a width of 12 cm which had been prepared in the same manner as in Example 2 was wound 10 times around a silicone rubber tube 3 as the deformable member with which a cylindrical steel member 2 having holes was covered (see a perspective view shown in FIG. 5), and the whole assembly was then placed in a bellows mold 6 shown in FIG. 6 and FIG. 7. Except for these steps, the same procedure as in Example 2 was carried out. As a result, a bellows was obtained, the size of the molded article being length=120 mm, pitch number=9, maximum outer diameter=80 mm, minimum outer diameter=76 mm, maximum inner diameter=73 mm, minimum inner diameter=71 mm, wall thickness at top of thread=3.5 mm and wall thickness at bottom of thread=2.5 mm.

EXAMPLE 5

Figure 8:
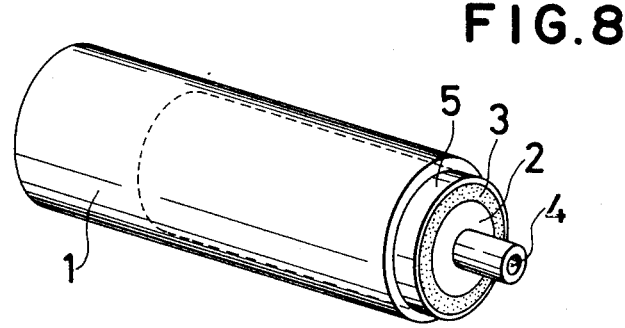
FIG. 8 is a perspective view of a cylindrical deformable member around which a preformed UHMWPE sheet is wound.
Figure 9:
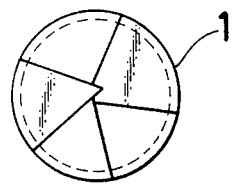
FIG. 9 is a front view of an end portion of the member shown in FIG. 8, the end portion being folded.
Figure 10:
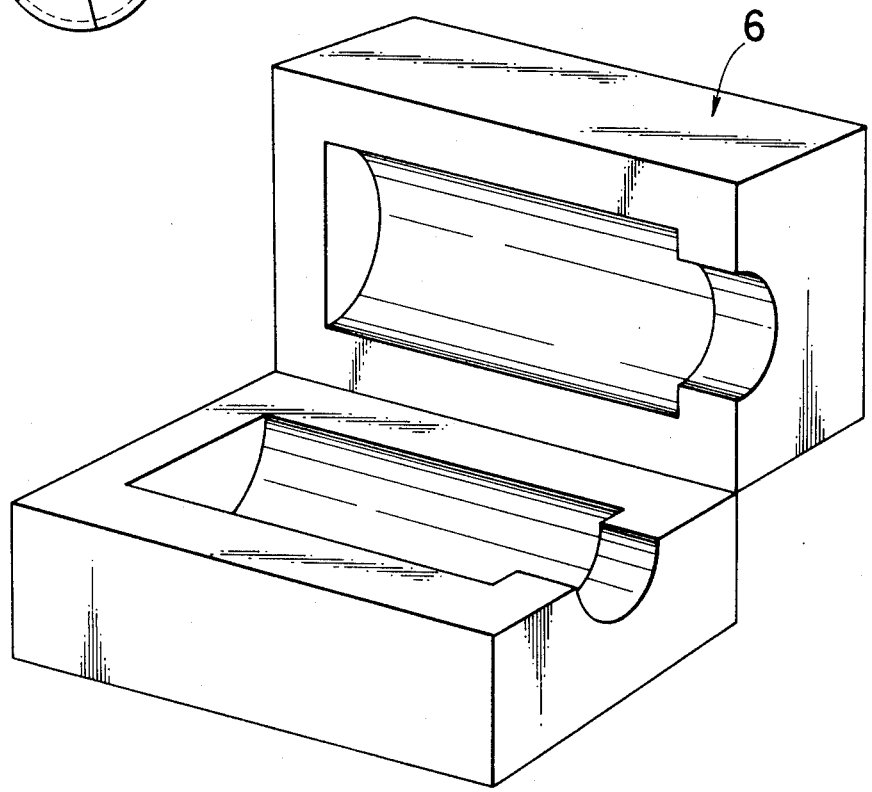
FIG. 10 is a perspective view of a cylinder mold.
Figure 11:
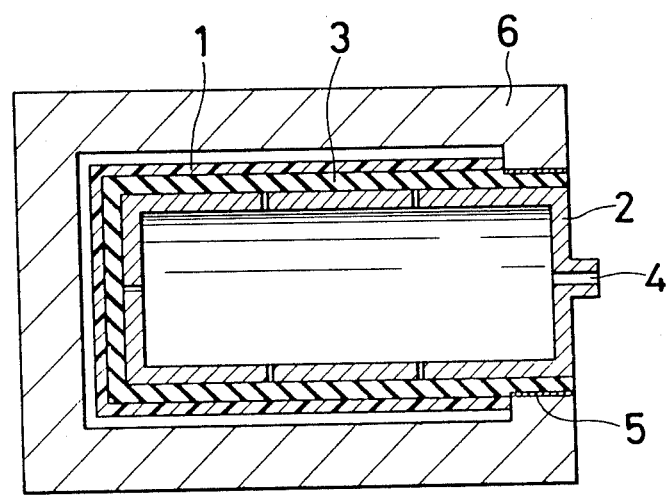
FIG. 11 is a schematic section of the cylinder mold in which the deformable member and a preformed UHMWPE sheet are set.

There was used a steel cylindrical member 2 having holes which was covered with a silicone rubber tube 3 as a deformable member, and the same preformed sheet 1 having a width of 18 cm as in Example 2 was wound 5 times around the member 2 (FIG. 8). The end portion of the preformed sheet protruded from one end of the cylindrical member was folded (FIG. 9) to form a circular shape. The deformable member was then placed in a heated mold 6 which was a little larger than the member therein (FIGS. 10 and 11).

Next, air was blown through the pressurizing hole 4, and the same procedure as in Example 2 was repeated to obtain a cylindrical hollow molded article, the size of the latter being height=140 mm, an outer diameter=80 mm, wall thickness of the side=1.5 mm and wall thickness of the bottom=1.5 mm.

EXAMPLE 6

Figure 12:
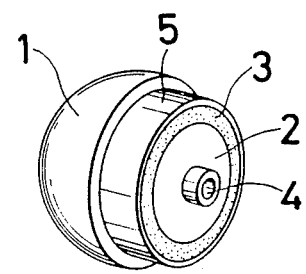
FIG. 12 is a perspective view of a hemispherical deformable member which is covered with a preformed UHMWPE sheet.
Figure 13:
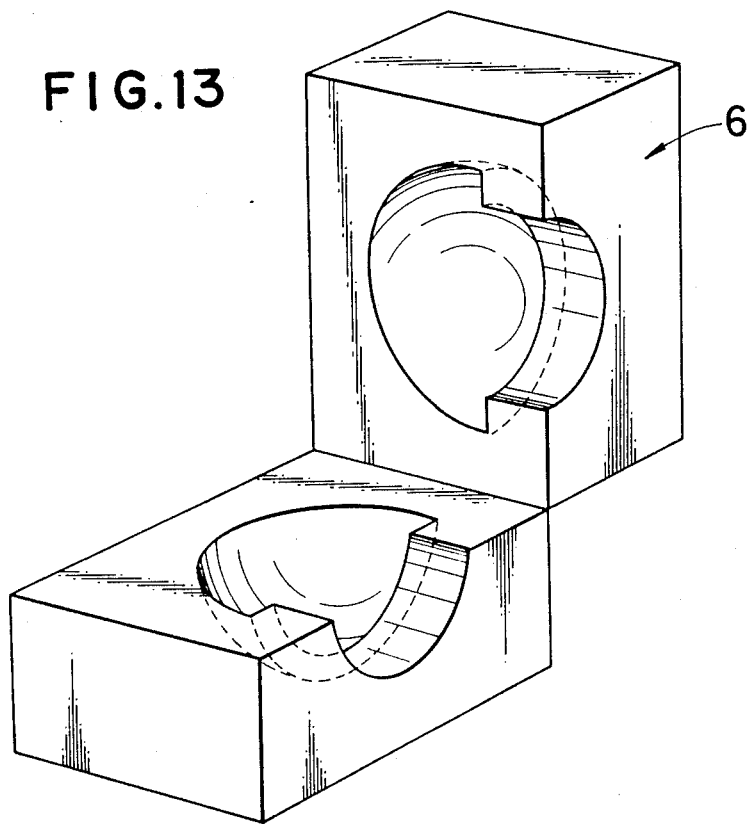
FIG. 13 is a perspective view of a hemisphere mold.
Figure 14:
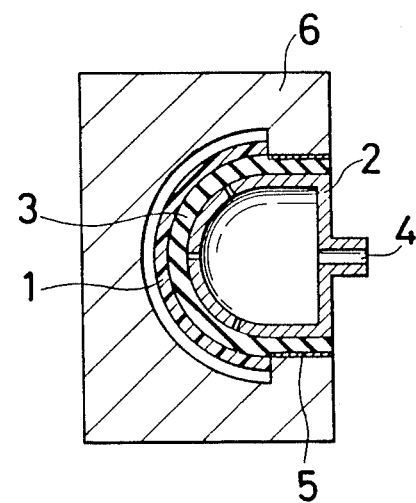
FIG. 14 is a schematic section of the hemisphere mold in which the deformable member and a preformed UHMWPE sheet are set.

A steel male mold 2 having holes which was hemispherical at the top and was covered with a silicone rubber tube 3 was covered on the hemispherical portion thereof with a hemispherical preformed sheet 1 having a diameter of 65 mm (FIG. 12), and a peripheral portion of the sheet 1 was folded to form a perfect hemispherical shape. Afterward, the whole assembly was placed in a mold 6 shown in FIGS. 13 and 14. In the same procedure as in Example 2, molding was size of the latter being diameter=40 mm, wall thickness at the central portion=0.3 mm and wall thickness at the peripheral portion=0.6 mm.

EXAMPLE 7

Figure 15:
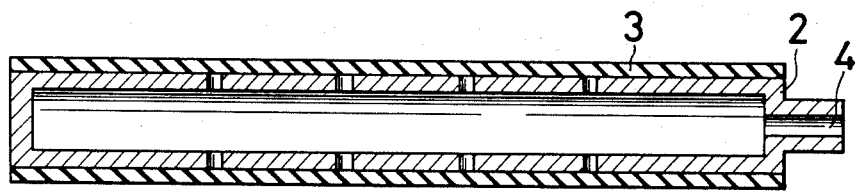
FIG. 15 is a schematic section of a deformable member regarding one embodiment of the present invention in which a rubber material is employed.
Figure 16:
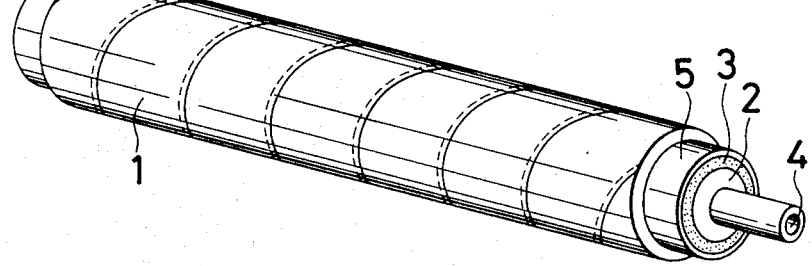
FIG. 16 is a perspective view of the deformable member around which a preformed UHMWPE sheet is wound in the form of spiral.

A cylindrical steel pipe 2 having 1 mm diameter holes, as shown in FIG. 15, was covered with a silicone rubber tube 3 having a thickness of 3 mm, and a preformed sheet 1 was then wound around the rubber tube 3 in a spiral state so as to overlap the edge portions of the sheet 1, as shown in FIG. 16.

Figure 17:
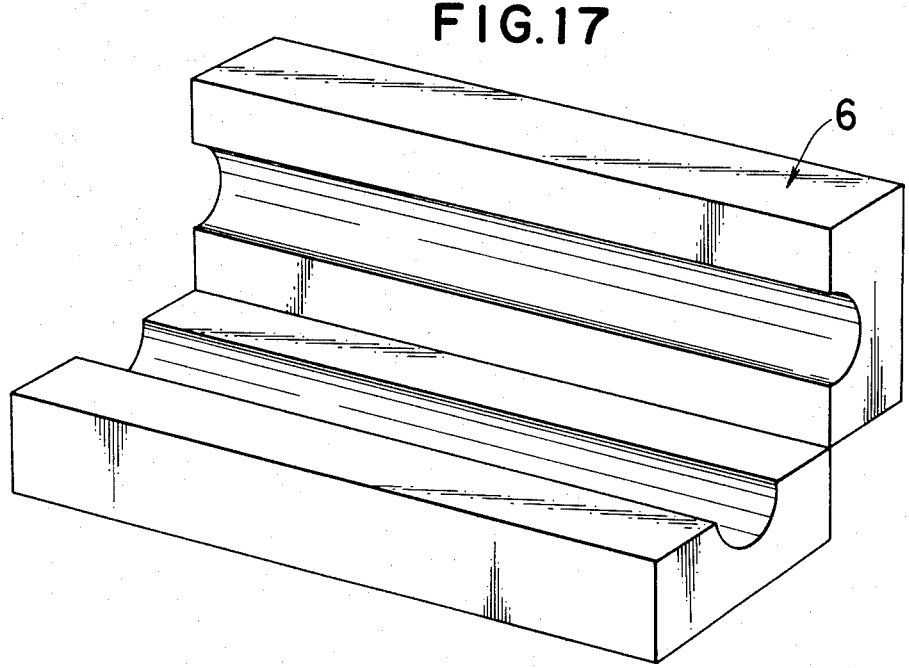
FIG. 17 is a schematic perspective view of a cylinder mold.

The resulting easy-deforming member around which the preformed sheet had been wound was placed in an openable cylindrical mold 6 heated up to 180° C. which was a little larger than the easy-deforming member, as shown in FIG. 17. Then, the mold was closed, and the silicone rubber tube 3 was fastened on the end portion thereof by a ring 5 (FIG. 18).

Figure 18:
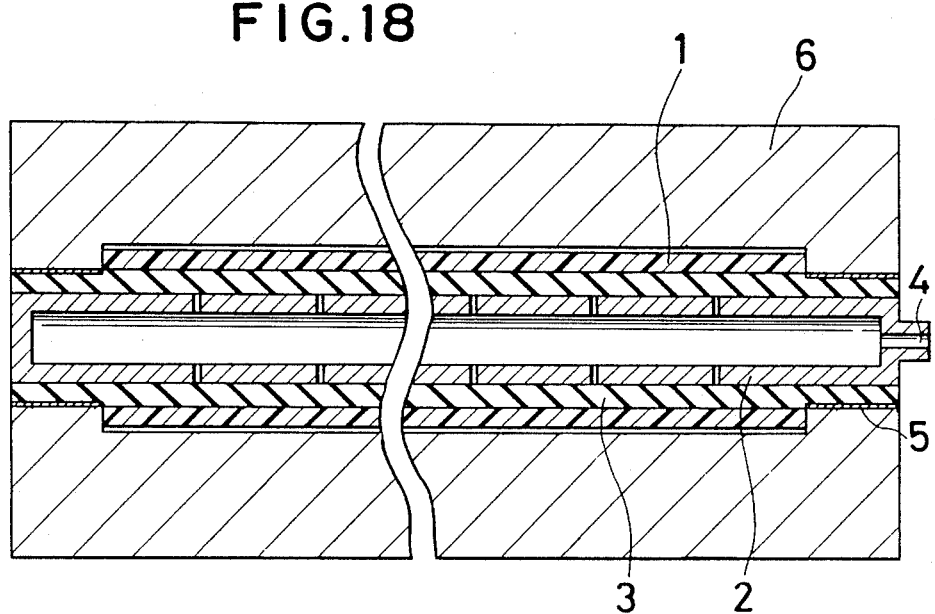
FIG. 18 is a schematic section of the cylinder mold in which the deformable member wound with a preformed UHMWPE sheet is set.

FIG. 18 shows a section in which the easy-forming member was set in the mold. An air pressure of 12 kg/cm² was applied through a pressurizing hole 4 to expand the silicone rubber tube 3 and to thereby press the preformed sheet 1 against the mold 6. The heating and pressurizing operation was carried out for 5 minutes in this way, whereby the sheet was melted and densified.

Then, the mold 6 was cooled to a level of room temperature, remaining pressurized, and the air was drawn off through the pressurizing hole 4. The mold was then opened, and at this time, a UHMWPE pipe which was completely densified as obtained.

This pipe had a outer diameter of 50 mm and a wall thickness of 0.3 mm. Further, a test piece was prepared by cutting off a certain portion of the obtained pipe and was subjected to a physical properties measuring test. The results are set forth here.

Tensile strength at yield point . . . 200 kg/cm²
Tensile strength at break . . . 395 kg/cm²
Elongation at break . . . 400%
(Testing method: ASTM-D638)

EXAMPLE 8

The same procedure as in Example 7 was carried out with the exception that three preformed sheets were superposed, and a pipe was obtained having an outer diameter of 50 mm and a wall thickness of 0.9 mm. Physical properties were evaluated. The results are as follows:

Tensile strength at yield point . . . 200 kg/cm²
Tensile strength at break . . . 400 kg/cm²
Elongation at break . . . 400%

EXAMPLE 9

Figure 19:
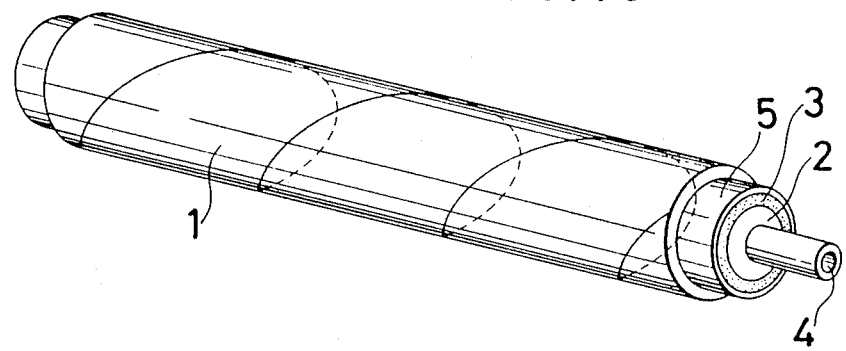
FIG. 19 is a perspective view showing another manner of winding the preformed UHMWPE sheet.

The same procedure as in Example 7 was carried out with the exception that a preformed sheet was wound in a spiral state as shown in FIG. 19 without overlapping the edge portions of the sheet as shown in FIG. 16 and was further wound in a crossing direction so as to overlap and cross the already wounded sheet, so that a pipe was obtained having an outer diameter of 50 mm and a wall thickness of 0.6 mm. Physical properties are as follows:

Tensile strength at yield point . . . 200 kg/cm²
Tensile strength at break . . . 395 kg/cm²
Elongation at break . . . 400%

EXAMPLE 10

An unsaturated polyester resin consisting of propylene glycol, maleic anhydride, phthalic anhydride, adipic acid and styrene was blended with a hardening accelerator, and a glass cloth was impregnated with the resulting blend to prepare a precursor comprising an unsaturated polyester resin composition. Next, between a UHMWPE sheet preformed in the same manner as in Example 1 and the aforesaid precursor, a film of an ethylene-vinyl acetate-glycidyl methacrylate copolymer was interposed as an adhesive, and compression molding was then carried out. The results are set forth in Table 1.

It can be understood from the results in Table 1 that the laminate of the unsaturated polyester and the UHMWPE sheet was improved remarkably in elastic modulus in flexure. Further, it is apparent that the laminate was also improved noticeably in the resistance to a repeated impact, when the thickness of the UHMWPE was 0.4 mm or more. In particular, when the outermost layer of the laminate was the UHMWPE sheet, the improvement in the impact strength was great.

TABLE I

| Constitution* of sheet | Thickness (mm) | Flexural modulus (kg/mm²) | Repeated** impact (number) |
|---|---|---|---|
| A/B/A | 0.25/0.2/0.25 | 1010 | 2 |
| A/B/A | 0.25/0.3/0.25 | 1020 | 3 |
| A/B/A | 0.25/0.4/0.25 | 790 | 8 |
| B/A/B/A/B | 0.15/0.25/0.3/0.25/0.15 | 330 | 10 or more |

*A: Precursor of the unsaturated polyester
B: Preformed sheet of the UHMWPE crude powder
**A 10 mmφ steel ball was put on the sample sheet and a 300 g weight was caused to fall from a height of 50 cm. In this case, the number of the repeated falling operations until the occurrence of cracks in the sheet is recorded.
Conditions of compression molding: 170° C. × 20 kg/cm² × 20 min.

EXAMPLE 11

An urethane binder (trade name BOND KU10; Konishi Co., Ltd.) was applied onto the surface of a non-rebounding rubber (trade name HANENITE; Naigai Rubber Co., Ltd.) having a thickness of 5 mm, and a UHMWPE sheet preformed in the same procedure as in Example 1 was superposed on the surface coated with the binder. Compression molding was then carried out at 170° C. under a pressure of 4 kg/cm² for 20 minutes and was afterward cooled still in the pressurized state, in order to obtain a laminate of the UHMWPE sheet and the rubber. The results of its physical properties are set forth in Table 2.

COMPARATIVE EXAMPLE 2

The same procedure as in Example 11 was repeated with the exception that a UHMWPE crude powder was substituted for the preformed UHMWPE sheet, in order to obtain a laminate of the UHMWPE and the rubber. The results of its physical properties are set forth in Table 2.

The results in Table 2 indicate that when the thickness of the preformed sheet was in excess of 1 mm, properties of the non-bound rubber were largely impaired. Further, when the UHMWPE crude powder was used, the thickness of the UHMWPE layer was noticeably uneven, and thus uniform products were not manufactured. In addition, in order to prepare the UHMWPE layer having a thickness of 1 mm or less, a very great labor was required, and for this reason, the manufacture of such a UHMWPE layer was impossible in fact.

TABLE 2

| UHMWPE Material | | UHMWPE Layer | | |
|---|---|---|---|---|
| | | Thickness (mm) | Thickness Deviation (%) | Bound Elasticity (%) |
| Example 11 | | | | |
| 1 | Preformed Sheet | 0.3 | 8 | 8 |
| 2 | " | 0.5 | 5 | 12 |
| 3 | " | 1 | 4 | 38 |
| 4 | " | 3 | 2 | 41 |
| Comparative Example 2 | | | | |
| 1 | Crude Powder | 0.5 | Note | — |
| 2 | " | 3 | 15 | 39 |

Note:
Holes were formed at several positions, and a product having a good appearance could not be obtained.

EXAMPLE 12

A UHMWPE sheet preformed by the same procedure as in Example 1 was superposed on an aluminum plate (a substrate) with the interposition of a polyethylene (an adhesive) modified with maleic anhydride, and pressure molding was carried out at a temperature of 180° C. Additional experiments were performed varying the substrates and the adhesives, and all the results are set forth in Table 3.

TABLE 3

| Substrate | Adhesive | Thickness of UHMWPE Layer (mm) | Peel Strength at 180° (kg/cm) |
|---|---|---|---|
| Aluminum Plate | A | 0.3 | 5.4 |
| Cedar Plate | B | 0.5 | 2.5 |
| PET Sheet | C | 0.3 | 2.7 |
| Cotton Cloth | D | 0.3 | 3.2 |
| Japanese Paper | D | 0.5 | Note |
| Aluminum Plate | B | 0.3 | 3.1 |

Note:
The substrate was broken.
Adhesive
A: Polyethylene modified with maleic anhydride
B: BOND KU10 (urethane series; Konishi Co., Ltd.)
C: Ethylene-Vinylacetate-Glycidylmethacrylate copolymer
D: Ethylene-Vinylacetate copolymer The UHMWPE is poor in processability, and thus is difficult to mold by means of a usual extrusion or injection molding. Therefore, with regard to thin-wall molded articles, hollow molded articles such as a pipe, a bellows, an elbow and a tee, and special form articles, their molding is very hard. For example, a short pipe may be manufactured by cutting operation, but the manufacture of a long pipe is impossible in such a manner. Moreover, the cutting operation tends to increase cost noticeably.

According to the present invention, however, the long pipes can be manufactured inexpensively and simply.

In addition, such a long pipe has a remarkable effect in delivering a slurry, a powder or the like therethrough, and the special form articles such as a stirrer, a vessel, a bellows and the like regarding the present invention can be utilized as tools for civil engineering and construction and as parts for various industrial machines.

What is claimed is:

1. A method for preparing a molded hollow article of an ultra-high molecular weight polyethylene comprising the steps of providing a mold having a deformable member; positioning a porous sheet of said ultra-high molecular weight polyethylene about said deformable member; applying heat and deforming said deformable member with sufficient pressure to thereby cause said sheet to adhere closely to said mold, whereby said sheet is melted and densified.

2. The method according to claim 1 wherein said ultra-high molecular weight polyethylene has an intrinsic viscosity of 8 dl/g or more in a decalin solution at 135° C.

3. The method according to claim 1 wherein said porous sheet is a sheet preformed by feeding an ultra-high molecular weight polyethylene powder between at least two heated rollers rating in mutually reverse directions, wherein said powder is melted at a temperature above 140° C.

4. The method according to claim 1 wherein said sheet is superposed with a substrate comprising at least one material selected from the group consisting of thermoplastic resin, thermosetting resin, rubber, metallic foil, metallic plate, wire mesh, cloth and paper and wherein a laminate is formed.

5. The method according to claim 1 wherein said polyethylene has an intrinsic viscosity of at least 8 dl/g in a decalin solution at 135° C.

6. The method according to claim 1 wherein said porous sheet is prepared by compounding solvent-suluba components with ultra-high molecular weight polyethylene and thereafter removing solvent-soluble components by extraction.

7. The method according to claim 1 wherein said sheet is prepared by feeding ultra-high molecular weight polyethylene powder between at least two heated rolls rotating in mutually reverse directions.

8. The method according to claim 7 wherein said sheet is prepared at a temperature of at least about 140° C.

9. The method according to claim 4 wherein said thermoplastic resin is selected from the group consisting of polyolefin resins, copolymers of alpha-olefins with other monomers, polystyrene resins, polyacrylic resins, polyvinylchoride resins, polyvinylidene chloride resins and polyamide resins.

10. The method according to claim 4 wherein said thermosatins resins are selected from the group consisting of epoxy resins, phenol resins, urethane resins, urea resins, melamine resins, diallyl phthalate resins and unsaturated polyester resins.

11. The method according to claim 1 wherein the molding temperature is maintained between about 130° C. and 250° C.

12. The method according to claim 1 wherein the molding temperature is maintained between about 140° C. and 300° C.

13. The method according to claim 1 wherein the deformation or molding pressure is maintained above about 0.1 kg/cm².

14. The method according to claim 1 wherein the deformation or molding pressure is maintained above about 1 kg/cm².

15. The method according to claim 1 wherein said deformable member is deformed by applying pressure to a surface of the deformable member opposite a surface carrying said porous sheet.

* * * * *